United States Patent [19]
Turnbull et al.

[11] Patent Number: 5,923,028
[45] Date of Patent: Jul. 13, 1999

[54] ADJUSTMENT OF PHOTOCONDUCTIVE CELL

[75] Inventors: Robert Ralph Turnbull, Holland; Robert Charles Knapp, Coloma; David Joseph Schmidt, Holland, all of Mich.

[73] Assignee: Gentex Corporation, Zeeland, Mich.

[21] Appl. No.: 08/828,907

[22] Filed: Apr. 2, 1997

[51] Int. Cl.⁶ .................................................. H01J 40/14
[52] U.S. Cl. .............................. 250/214 R; 250/214 AL; 250/206; 315/82; 359/265
[58] Field of Search ............................. 250/200, 214 R, 250/214.1, 214 AL, 214 B, 206; 315/82; 359/265, 270, 601–604

[56] References Cited

U.S. PATENT DOCUMENTS

| | | |
|---|---|---|
| 4,902,108 | 2/1990 | Byker . |
| 5,193,029 | 3/1993 | Schofield et al. ....................... 359/604 |
| 5,424,898 | 6/1995 | Larson et al. . |
| 5,451,822 | 9/1995 | Bechtel et al. ............................ 315/82 |
| 5,486,952 | 1/1996 | Nagao et al. . |
| 5,550,677 | 8/1996 | Schofield et al. . |
| 5,581,406 | 12/1996 | Kobayashi et al. . |

*Primary Examiner*—Stephone Allen
*Attorney, Agent, or Firm*—Fitch, Even, Tabin & Flannery

[57] ABSTRACT

A system and method for optimizing the signal range of a photocell for all ambient lighting conditions. A switched resistor circuit is serially connected to the photocell. The duty cycle of the switched resistor circuit is controlled to provide an optimal signal range for the photocell in both light and dark ambient light conditions.

16 Claims, 2 Drawing Sheets

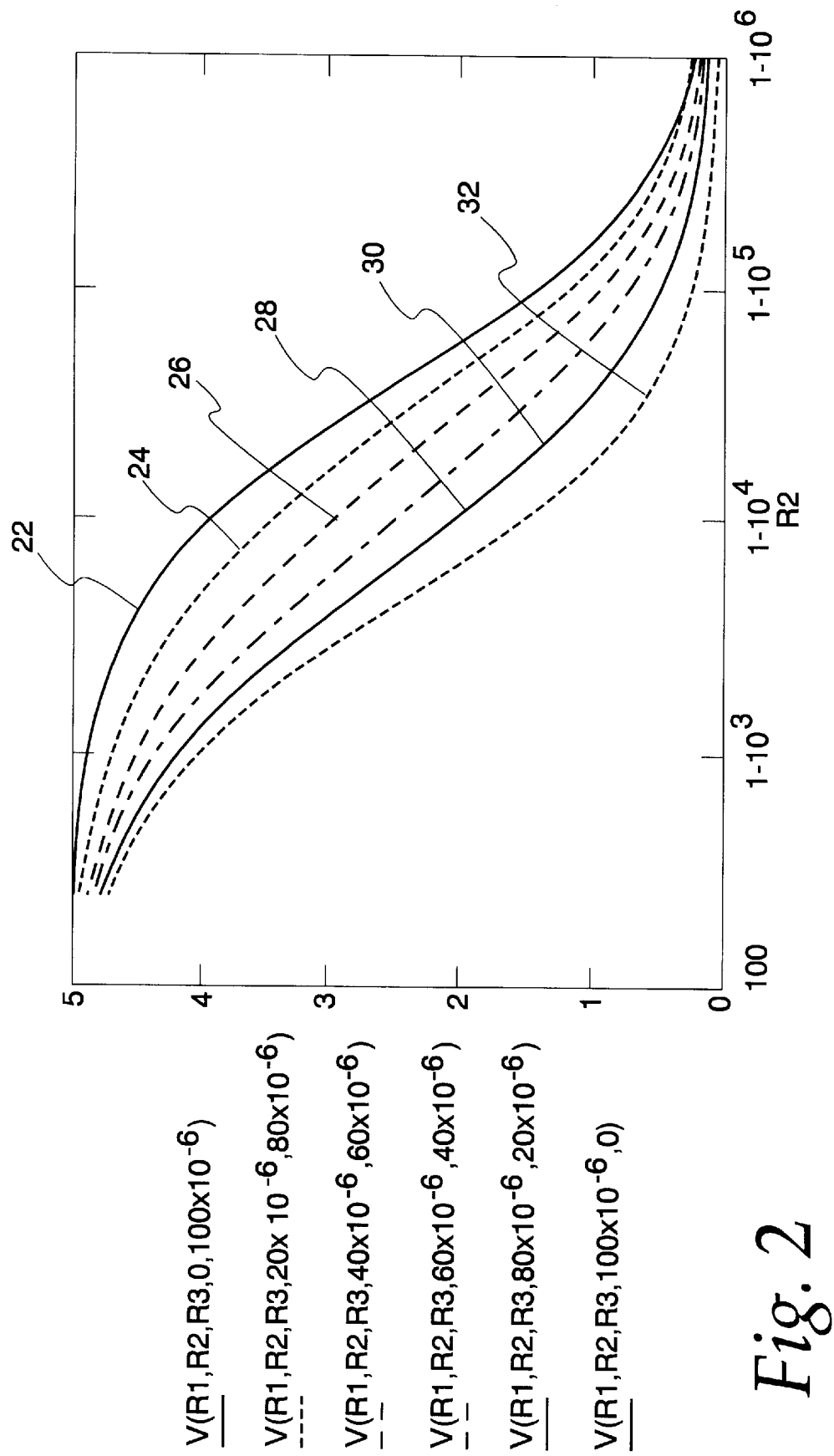

ADJUSTMENT OF PHOTOCONDUCTIVE CELL

BACKGROUND OF THE INVENTION

1. Field of the Invention

A system and method for optimizing the output signal range of a photocell and more particularly, to a system and method of optimizing the output signal range of a photocell for all ambient lighting conditions by way of a serially connected switched resistor circuit, the duty cycle of which may be varied to provide an optimal signal range in both light and dark ambient lighting conditions.

2. Description of the Prior Art

Various types of photo sensors are known. One known type of photo sensor is a photocell. Such photocells act as light dependent resistors. In particular, the resistance output of such photocells varies as a function of the level of illumination incident on the surface of the device.

Such photocells are known to be made from Cadmium Sulfide ("CdS") Lead Sulfide ("PbS"), Cadmium Selenide, Ge, Si and other semiconductors. The resistance range of such photocells is known to vary from about 1–2 M ohms signal in darkness to as low as 10–1,000 ohms when the photocell is exposed to relatively bright light.

Various applications are known for such photocells. For example, photocells are widely used to control street lamps and other types of lamps in order to turn the lamps on at the onset of darkness and keep the lamp off during the daytime. Such photocells are also known to be used in automotive applications. In particular, in such automotive applications, the photocells are used to measure the glare relative to the ambient light level in order to control the reflectance of electrochromic mirrors used for rearview and sideview mirrors.

Because of the relatively wide resistance range of such photocells, matching resistors are known to be used to optimize the output signal range for night operation. In particular, such matching resistors are known to be serially connected to the photocells. The matching resistors are selected to provide an optimal signal range (i.e., resistance range) during nighttime conditions. Unfortunately, the resistance ranges of CdS photocells varies widely. Various techniques are used for calibrating such photocells, for example, as described in U.S. Pat. Nos. 5,193,029 and 5,451,822, hereby incorporated by reference. Calibration or matching resistors are known to be connected to the photocells to achieve a predetermined output level of the photocell for a predetermined light level. Such matching resistors are then hand-inserted into the assembly utilizing the photocell. Such a process is relatively labor-intensive and slows the manufacturing output time for manufacturing assemblies which include such photocells and also increases the price of the unit. There are other problems with such photocells. In particular, as mentioned above, a matched resistor is selected and serially connected to the photocell to optimize the output signal range during dark conditions. Once the matched resistor is hard-wired to the photocell, the output signal range of the photocell will not be optimal for measuring daytime light levels.

SUMMARY OF THE INVENTION

It is an object of the present invention to solve various problems in the prior art.

It is yet another object of the present invention to provide a method and system for optimizing the output signal range for a photocell during both light and dark ambient lighting conditions.

It is yet another object of the present invention to provide a method and system for automating the calibration of such photocells.

Briefly, the present invention relates to a system and method for optimizing the signal range of a photocell for all ambient lighting conditions. In particular, a switched resistor circuit is electrically connected to the photocell. The duty cycle of the switched resistor is controlled to provide an optimal signal range for the photocell in both light and dark ambient light conditions.

BRIEF DESCRIPTION OF THE DRAWINGS

These and other objects of the present invention will be readily understood with reference to the following description and attached drawings wherein:

FIG. 2 is a graphical illustration of the output voltage as a function of the duty cycle for a photocell connected to a switched resistor circuit at different light levels in accordance with the present invention.

DETAILED DESCRIPTION OF THE PREFERRED EMBODIMENTS

Figure 1:
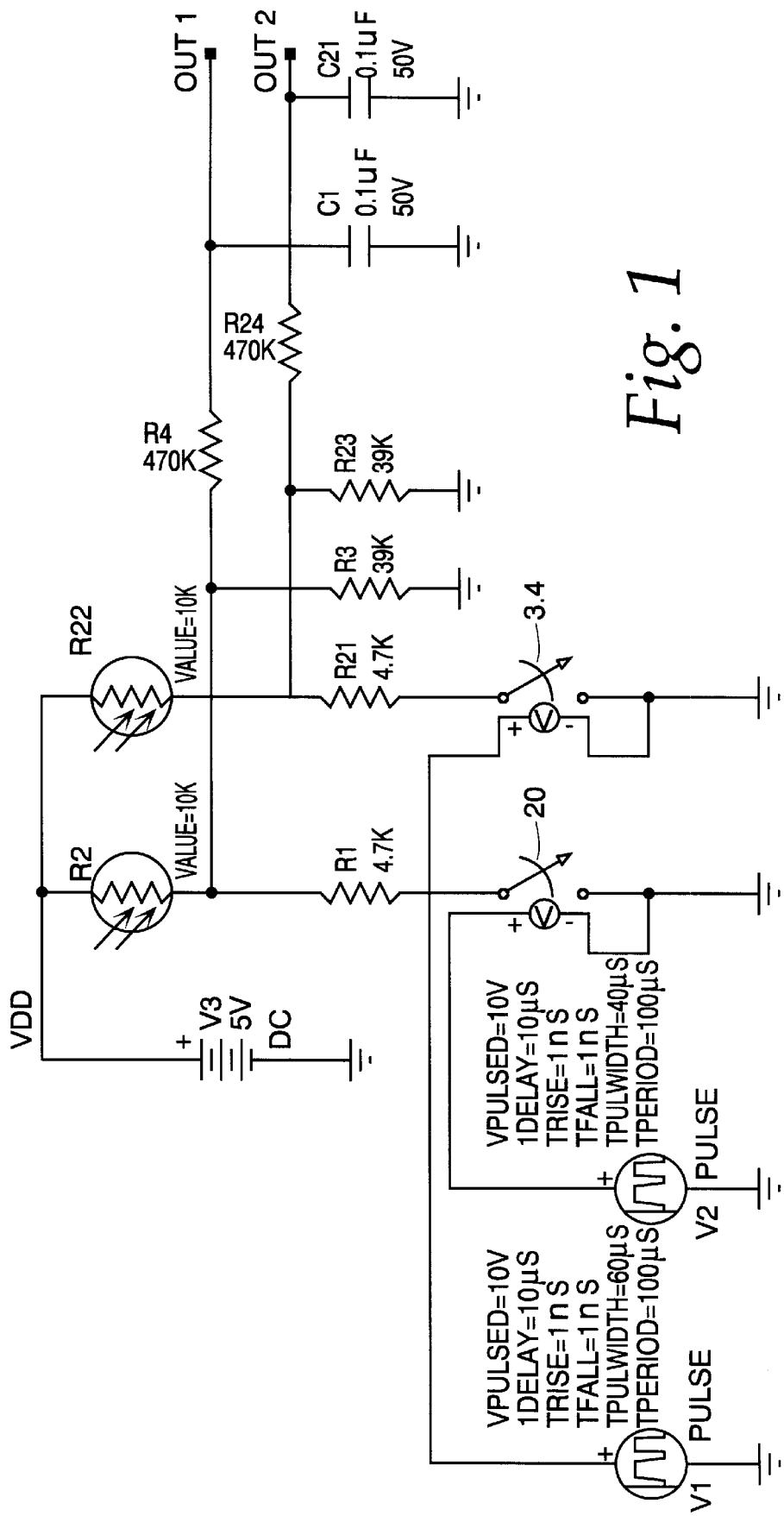
FIG. 1 is a schematic diagram of the system for optimizing the output signal range of a photocell in accordance with the present invention.

The present invention relates to a method and system for optimizing the output signal range of a photocell, such as a Cadmium Sulfide ("CdS") photocell, during all ambient lighting conditions. As will discussed in more detail below, the method and system in accordance with the present invention eliminates the labor-intensive method of selecting and manually inserting matched resistors for calibration of such photocells and also allows the photocell to provide an optimal output signal range for both day and night conditions.

FIG. 1 illustrates an automotive application in which a pair of photocells R2 and R22 are used to control the amount of reflectance for an electrochromic mirror used as either a rearview mirror or a sideview mirror. In such an application, one of the photocells is used to measure the ambient light level and is disposed generally behind the mirror while the other photocell is used to measure the ambient light level incident upon the mirror. In such an application, reflectance of the electrochromic mirror is controlled as a function of the glare relative to the ambient light level. However, as will be understood by those of ordinary skill in the art, the present invention is clearly applicable for use in applications where only a single photocell is used, such as in a street lamp control application.

Since the circuitry in accordance with the present invention is identical for both of the photocells R2 and R22, only the circuitry for a single photocell will be described. Referring to FIG. 1, a photocell R2, for example, a Cadmium Sulfide ("CdS") is serially connected to a resistor R1, which, in turn, is connected to a switch, identified with the reference numeral 20. A second resistor R3 is connected in parallel across the serially connected resistor R1 in the switch 20 forming a switched resistor circuit in accordance with the present invention. As will be discussed in more detail below, the actual resistance value provided by the switched resistance circuit is a function of the duty cycle of the switch 20. Although the devices R1, R3, R21 and R23 are depicted as resistors, virtually any device which can provide a resistance output can be used, such as an FET, collectively referred to as "resistance or resistance device".

The values of the resistors R1 and R3 are selected to enable an output signal range to be selected for both light and dark lighting conditions. As will be discussed in more detail below, the effective resistance of the switched-resistance circuit is a function of the duty cycle of the switch 20. As such, the optimal matched resistance values for the photocell R2 can be predetermined to provide an optimal output signal range for both daytime and nighttime operation. These values for the duty cycle can be stored, for example, in an Electrically Erasable Programmable Read-Only Memory (EEPROM) and programmed to provide a programmable resistance in order to provide an optimal signal range for both day and night operations.

In order to provide a voltage output, a voltage source V3, for example, a five-volt DC source, is connected to the photocell R2. An output terminal OUT1 is serially connected to the other side of the photocell R2. In order to provide a relatively stable output voltage signal, the output voltage of the photocell R2 is filtered by way of a low pass filter. The low pass filter is formed from a resistor R4 and capacitor C1.

Various components are suitable for use as the switch 20. The switch 20 can be implemented as an open collector port on a microprocessor, a bi-directional microprocessor port, an analog switch, a MOSFET, a JFET, a bipolar transistor or virtually any type of switch in which the duty cycle can be controlled.

As will be shown in detail below, the transfer function of the voltage divider formed by the resistors R1, R2 and R3 is the average of the transfer function of the divider with the switch 20 open and with the switch 20 closed.

In the first condition, when the switch 20 is closed, the equivalent resistance $R_{eq}$ is given in Equation No. (1):

$$R_{eq} = \frac{1}{\left(\frac{1}{R1} + \frac{1}{R3}\right)} \quad (1)$$

As mentioned above, a DC voltage source V3 is connected to the photocell R2 in order to provide an output signal voltage. The output signal voltage V1 with the switch 20 closed is given by Equation No. (2):

$$V1 = Vs \cdot \left[\frac{\left(\frac{1}{R1+R3}\right)}{\left(\frac{1}{R1}+\frac{1}{R3}\right)^{+R2}}\right] \quad (2)$$

After performing algebraic simplification, the output voltage V1 of the photocell R2 with the switch 20 closed is given by Equation No. (3):

$$V1 = R3 \cdot R1 \cdot \frac{Vs}{(R1 \cdot R3 + R2 \cdot R3 + R2 \cdot R1)} \quad (3)$$

The output voltage of the photocell R2 with the switch 20 open is identified as V2. When the switch 20 is open, the voltage V2 is a simple voltage divider given by Equation No. (4):

$$V2 = Vs \cdot \frac{Vs}{R2 + R3} \quad (4)$$

In order to determine the equivalent resistance between the two conditions, the effective output voltage V of the photocell R2 is the time weighted average during the two conditions. This time weighted average is given by Equation (5):

$$V = \frac{t_{on}}{t_{on} + t_{off}} \cdot V1 + \frac{t_{off}}{t_{on} + t_{off}} \cdot V2 \quad (5)$$

By substituting Equations 3 and 4 into Equation 5, a time weighted average output voltage V of the photocell R2 is provided by Equation No. (6):

$$V = \frac{t_{on}}{t_{on} + t_{off}} \cdot \left[R3 \cdot R1 \cdot \frac{Vs}{(R1 \cdot R3 + R2 \cdot R3 + R2 \cdot R1)}\right] + \frac{t_{off}}{(t_{on} + t_{off})} \cdot \left(V2 \cdot \frac{R3}{R2 + R3}\right) \quad (6)$$

Equation 6 can be simplified algebraically to arrive at Equation No. (7):

$$V = R3 \cdot Vs \cdot \frac{(t_{on} \cdot R1 \cdot R2 + t_{on} \cdot R3 \cdot R1 + t_{off} \cdot R1 \cdot R3 + t_{off} \cdot R2 \cdot R3 + t_{off} \cdot R2 \cdot R1)}{[(t_{on} + t_{off}) \cdot ((R1 \cdot R3 + R2 \cdot R3 + R2 \cdot R1) \cdot (R2 + R3))]} \quad (7)$$

The specific output voltage V for a given duty cycle is determined by plugging in values into Equation No. 7. For example, if: $V_s$=5, $T_{on}$=100 0.10$^{-6}$, $T_{off}$=100 0.10$^{-6}$, R1=10,000, R2=10,000 and R3=39,000, the output voltage V will be 3.098.

The output voltage range of the photocell R2 for given values for the resistors R1 and R3 will be an S-curve as generally illustrated in FIG. 2. These curves represent a graphical illustration of Equation No. 7 for specific values for the resistors R1 and R3 over the output resistance range of the photocell R2 for different duty cycles. For example, the curve 22 illustrates the output voltage range of the photocell R2 with selected values for R1=4.7K and R3 at 39K over the complete resistance range from 250 Ω to 1 MΩ of the photocell for duty cycles varying between 0 and 100%. The curves 24, 26, 28, 30 and 32 are similar but for different duty cycles as illustrated in FIG. 2.

As mentioned above, a circuit illustrated in FIG. 1 includes a second photocell R22 which includes a serially coupled resistor R21 which is in turn, connected to a switch 34. A resistor R23 is connected in parallel with the resistor R21 in the switch 34 to form the switched resistor circuit in accordance with the present invention. A low pass filter consisting of the resistor R24 and the capacitor C21 is used to filter the output to provide a stable output voltage at the output terminal OUT2. As mentioned above, the switched resistor circuit for the photocell R22 functions in the same manner as the switched resistor network connected to the photocell R2.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A circuit for optimizing the output signal range from a photocell, the circuit comprising:

a resistance device, electrically coupled to said photocell;

a switch coupled to said resistance device and said photocell adapted to provide variable resistance output values from said resistance device and said switch as function of a predetermined control signal applied to said switch; and means for generating said predetermined control signal in order to vary said resistance value of said resistance device.

2. The circuit as recited in claim 1, wherein said resistance device includes a first resistance serially coupled to said photocell.

3. The circuit as recited in claim 2 further including a second resistance electrically coupled to said photocell and said first resistance forming a switched resistor circuit.

4. The circuit as recited in claim 3, wherein said second resistance is electrically connected in parallel across said first resistance and said switch.

5. A circuit, for optimizing the output signal range of a photocell, the circuit comprising:

a resistance device electrically coupled to said photocell, said resistance device adapted to provide variable resistance output values as a function of a predetermined control signal; and means for generating said predetermined control signal in order to vary said resistance values of said resistance device, wherein said generating means is adapted to generate a control signal with a variable duty cycle.

6. The circuit as recited in claim 5, wherein said generating means includes a pulse width modulator (PWM).

7. The circuit as recited in claim 6, wherein the resistance of resistance device is varied as a function of the duty cycle of said PWM.

8. A method for optimizing the output signal range of a photocell, the method comprising the steps of:

(a) serially connecting a continuously variable resistance device to said photocell; and (b) automatically varying the resistance of said continuously variable resistance as a function of the ambient light level.

9. The method as recited in claim 8, wherein said resistance device is adapted to provide variable resistance as a function of a predetermined output signal.

10. The method as recited in claim 9, wherein said variable resistance includes a switched resistor circuit, serially coupled to said photocell.

11. A method for optimizing the output signal range of this photocell, the method comprising of steps of:

(a) serially connecting a resistance device to said photocell; and (b) automatically varying the resistance of said variable resistance as a function of the ambient light level, wherein said resistance device is adapted to provide a variable resistance as a function of a predetermined output level and includes a switch resistor circuit serially coupled to said photocell, wherein said switched resistor circuit includes a switch whose duty cycle can be varied in order to vary the resistance.

12. A method for optimizing the output signal for a photocell for all ambient light conditions, the method comprising the steps of:

(a) connecting a continuously variable programmable resistance to said photocell;

(b) programming said continuously variable programmable resistance to vary said programmable resistance as function of the ambient light conditions.

13. A circuit for optimizing the output signal range of a photocell, comprising:

a continuously variable resistance device, electrically coupled to said photocell; and means for varying the resistance of said resistance device as a function of ambient light conditions.

14. The circuit as recited in claim 13, wherein said resistance device is a switched resistance circuit.

15. A circuit for optimizing the output signal range of a photocell comprising:

a resistance device, electrically coupled to said photocell; and means for varying the resistance of said resistance device as a function of ambient light conditions, wherein said resistance device is a switched resistance circuit and wherein said switched resistance circuit includes a programmable switch and one or more resistances, electrically coupled to said photocell, wherein said resistance varies as a function of the duty cycle of said switch.

16. The circuit as recited in claim 15 further including a memory device for storing predetermined values for the duty cycle of said switch, said predetermined values selected to optimize the output signal range of said photocell for different ambient light conditions.

* * * * *